Jan. 10, 1961   W. D. OWENS   2,968,025
PATROL CAR SIGNAL
Filed May 28, 1958   3 Sheets-Sheet 2

*INVENTOR.*
WILBUR D. OWENS
BY
ATTORNEY

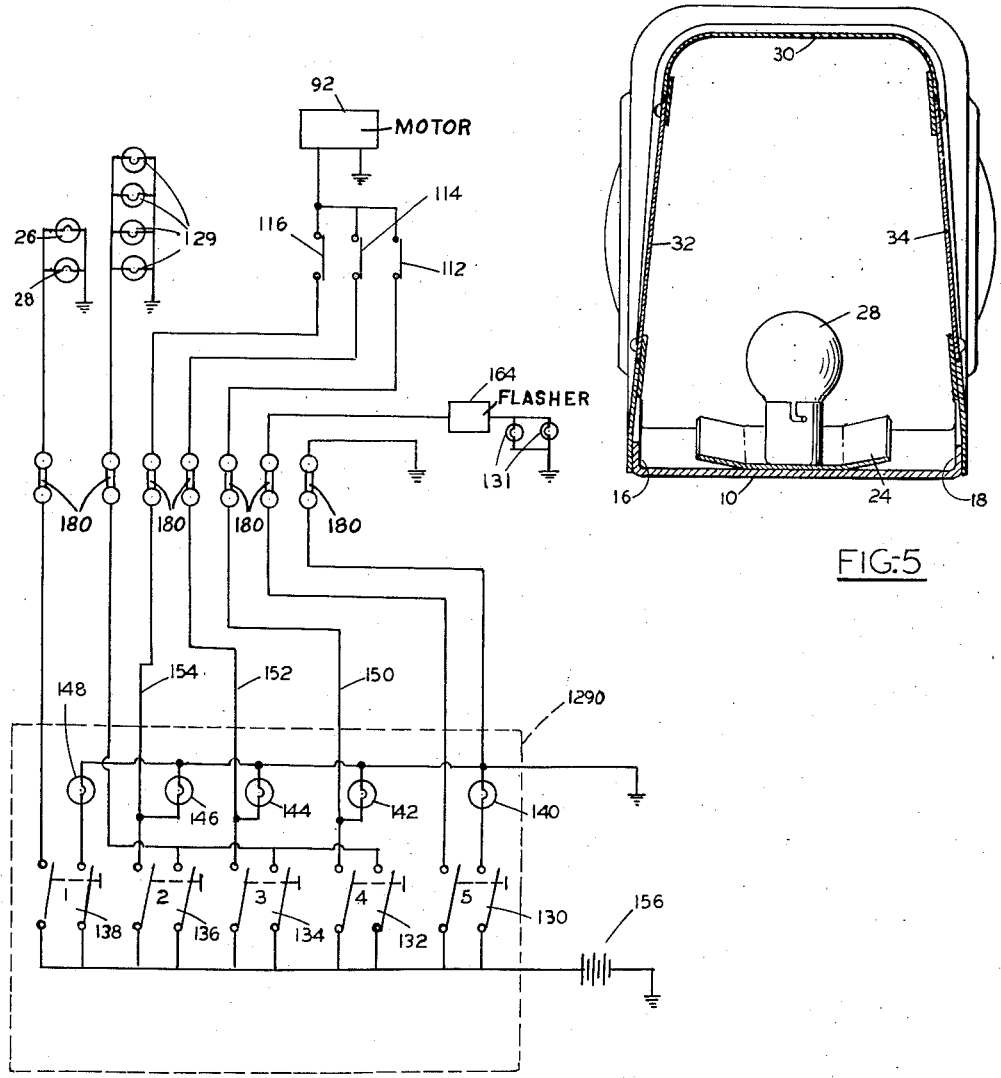

United States Patent Office 2,968,025
Patented Jan. 10, 1961

2,968,025

PATROL CAR SIGNAL

Wilbur D. Owens, Albany, Ga., assignor to American Signal Company, Albany, Ga., a corporation of Georgia Filed May 28, 1958, Ser. No. 738,440

7 Claims. (Cl. 340—125)

This invention relates to vehicle signals adapted for highway patrol cars, and more particularly to a signal which can be changed at will to issue commands to the drivers of other vehicles on the highway.

In highway patrol work it is desirable to communicate promptly with other vehicle drivers for the purpose of commanding such drivers to comply with law as, for example, the dimming of headlights, or the observance of speed limits, or in the apprehending of drivers for law infractions. At night time, it is difficult to signal such drivers effectively, and it is the common practice to stop the car requiring corrective action. On crowded highways the practice of stopping a vehicle merely to admonish the driver to slow up or dim lights interferes with traffic.

The present invention is directed to a signal whereby several selected orders may be issued to drivers of vehicles in motion, it being found that the issuing of commands by an indicia bearing illuminated signs, is effective in calling to the attention of drivers the immediate necessity for corrective action, such as reduction of speed or the dimming of headlights. At the same time the signal system may be employed to apprehend drivers where justified.

It is an object of the present invention to provide a vehicle roof signal having provision for selectively warning the drivers of other vehicles on the highway or the issuing of commands through employment of illuminated signs bearing such peremptory orders as Dim, Slow, Stop and the like. The invention is further directed to a signal employing a rotatable indicia bearing reel which may be quickly shifted to convey different orders at will, and which signal is of rugged construction, economical of manufacture and positive in its action.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings wherein like reference characters indicate like parts:

Figure 5 is a transverse sectional view taken substantially on line 5—5 of Figure 1;

Figure 6 is a circuit diagram; and

Figure 7 is a fragmentary enlarged sectional illustration of the rotating reel, with the reflector removed.

Figure 1:
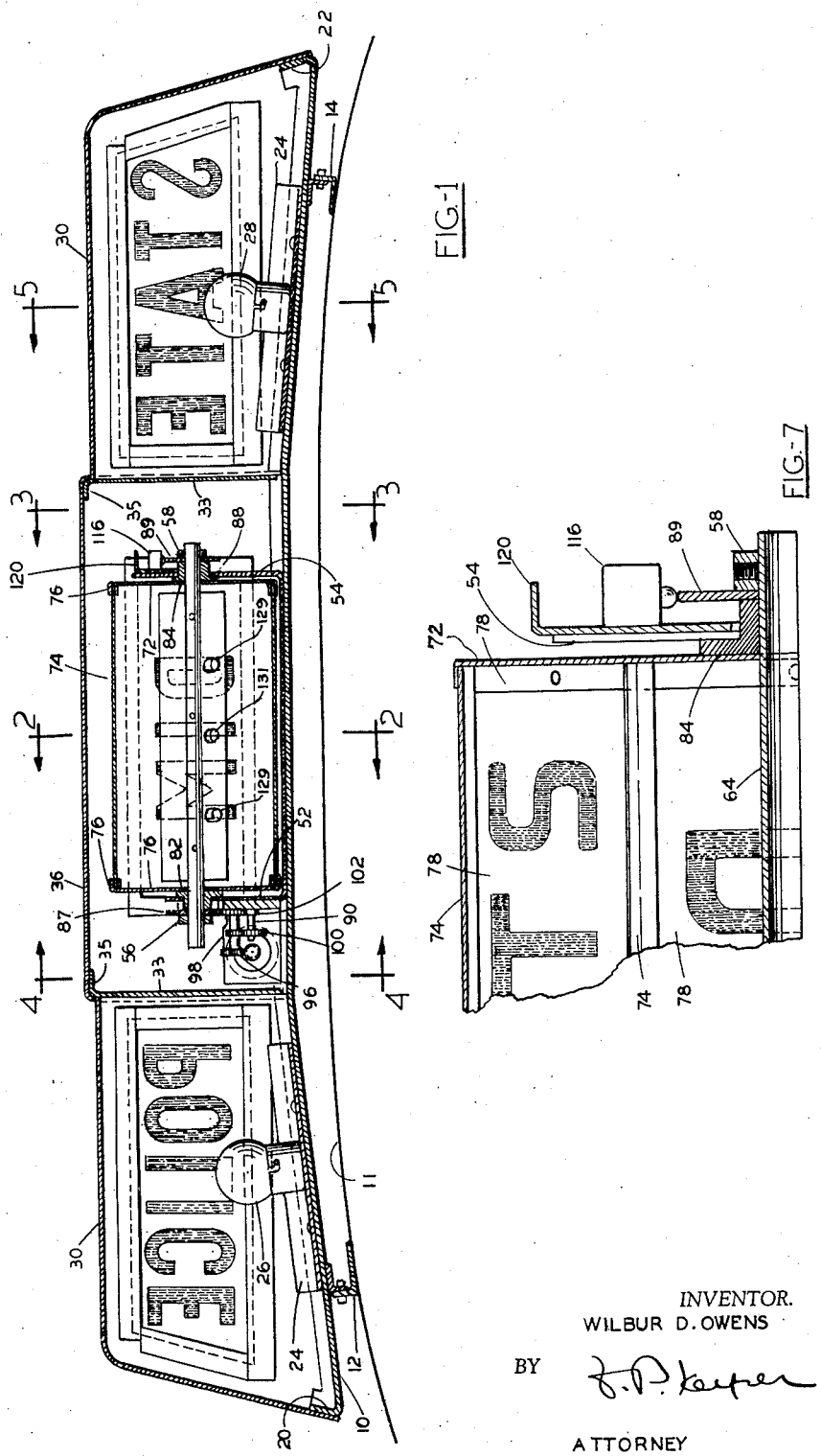
Figure 1 is a lengthwise sectional view through the signal.
Figure 2:
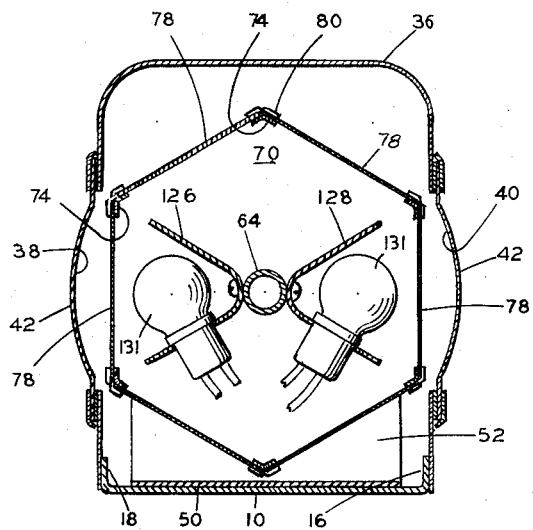
Figure 2 is a transverse sectional view taken substantially on line 2—2 of Figure 1.
Figure 3:
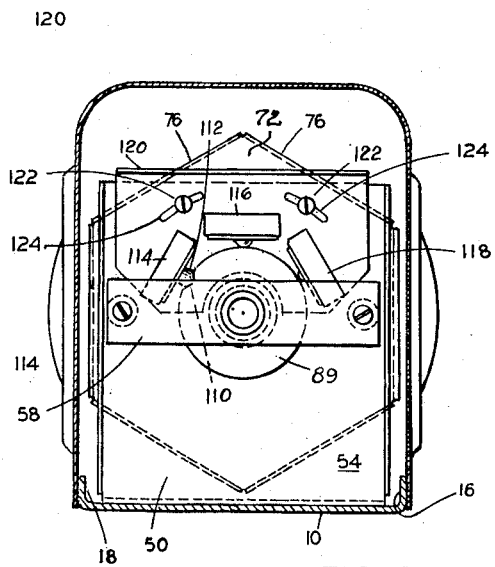
Figure 3 is a transverse sectional view taken substantially on line 3—3 of Figure 1.
Figure 4:
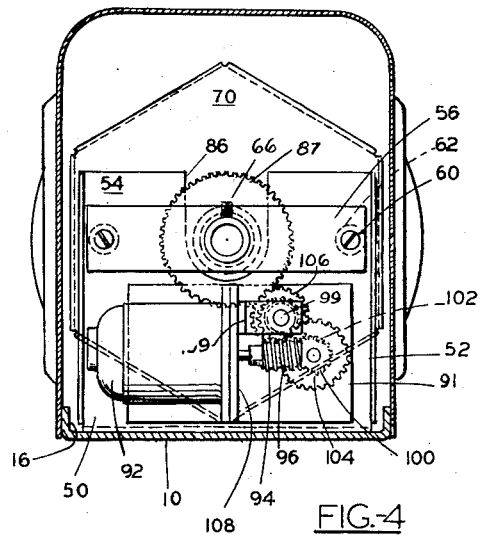
Figure 4 is a transverse sectional view taken substantially on line 4—4 of Figure 1.

Referring to Figure 1, there is shown a frame member 10 slightly arched to conform to the vehicle roof 11, and supported thereon on brackets 12 and 14. The frame consists of an upwardly facing channel member, having side flanges 16 and 18, and inwardly inclined end flanges 20 and 22. At each end of the frame member are mounted a lamp support and reflector 24, and one or more lamps as at 26 and 28. A housing 30 formed of sheet metal and having forward and rearward facing windows 32 and 34 is provided, the housing being secured to the flanges 16 and 18, and the respective end flanges 20 and 22. Each housing 30 is provided with a bulkhead or light shield 33 at the inner end, and is offset outwardly as at 35 to receive the central housing 36. The central housing is provided with forward and rearward facing rectangular windows 38 and 40, which are outwardly curved and formed of Plexiglas or the like as at 42, to provide clearance for the rotating mechanism within. The housing is secured to the flanges 16 and 18 of the frame member 10.

Within the central housing is a reel support bracket 50 mounted in the frame 10, the bracket having upstanding spaced end supports 52 and 54 between which is disposed a six sided hexagonal reel. Each of the end supports are provided with a transverse shaft support member 56 and 58 mounted on the respective end supports 52 and 54, threaded members 60 being employed extending through spacer sleeves 62 in the manner indicated, so as to space the members 56 and 58 away from the end supports, to provide clearance for the reel drive gear 87 and the control mechanism cam 89 at the opposite ends of the reel as will appear hereinafter.

A stationary tubular shaft 64 extends through the members 56 and 58, and is secured against rotation by any suitable means such as set screws 66 in the members 56 and 58. The reel with its six translucent faces 78 and the indicia, for example, Stop, Dim, Slow, comprises spaced hexagonal end plates, 70 and 72 connected together by 120° angle sectioned bars or ribs 74, secured to the inside faces of adjoining upwardly facing flanges 76 formed along the six sides of the end plates. The translucent panels 78 are secured to the flanges 76 at their ends, and by fingers 80 struck from the ribs 74. The opposed panels 78 carry like signals or signs such as Dim, Stop, or Slow as set forth. The reel end plates are provided with and secured to flanged bushings 82 and 84, which extend through clearance recesses or slots 86 and 88 in the end supports 52 and 54, and are secured to a drive gear 87 and a control cam 89 respectively at the opposite ends.

A reduction gear assembly 90 and drive motor 92 is secured by its end plate 91 to the support 52. The motor is provided with a worm 94, driving a worm wheel 96 and pinion 98, freely rotatable on a stub shaft 99, the pinion 98 meshing with a gear 100 and pinion 102, rotatably mounted on a second stub shaft 104. The pinion meshes with an idler gear 106, rotatably mounted on the stub shaft 99, and engages the gear 87 secured to the bushing 82, to drive the reel. The motor is mounted on a bracket plate 108 extending from the end plate, and the bracket plate is provided with an arm 109 to support the stub shaft 98 adjacent the worm 94.

The rotation of the reel to the three signal stations is controlled by the cam 89, having a single peripheral notch 110, adapted to receive any one of three actuating members 112 of the control switches 114, 116 and 118. Such control switches of the micro switch variety, are mounted on a plate 120 secured to the support 54 by screws 122, extending through arcuate slots 124, which are concentric in respect to the shaft center, and permit angular adjustment of the plate 120 to index the reel. Each of the switches is disposed at an angle of 60° from the adjacent switch, and each of their actuating members 112 consists of a spring pressed cam follower, which extends into the cam notch to open the switch.

Within the drum or reel and mounted on the stationary shaft are opposed V sectioned reflectors 126 and 128 which face and correspond to the rectangular translucent area of the panels 78 and are adapted to provide uniform illumination thereto. Each reflector is preferably provided with two white lamps 129 and a center red lamp 131, the lamp sockets shown in Figure 1, and the lamps being indicated by the same reference character. The red lamp is disposed in a flasher circuit. The wiring to the lamps within the reel may be conveniently brought out through the hollow shaft in any suitable manner (not shown).

The control circuit comprises a convenient switch box indicated at 1290, mounted on the dash or steering column or otherwise as desired and containing five manual switches 130, 132, 134, 136 and 138, each having tell-tale lamps 140, 142, 144, 146 and 148. The switches 132, 134 and 136 establish circuits 150, 152, and 154 respectively through cam actuated switches 112, 114, and 116 respectively to the motor 92. On the selective closing of any switch 132, 134, and 136, a circuit is established from the battery 156, connected to ground, through the corresponding cam switch 112, 114 or 116. If such cam switch be other than the one which is open, by reason of its actuator cam follower being disposed in the cam notch 110, the motor will start, and the reel will turn until the cam notch aligns with the follower of the particular switch of the circuit selected whereupon the circuit is instantly opened. The rotation is always in the same direction and may be as much as 300 degrees for a single change. Thus any one of three positions can be quickly obtained by rotation from the last employed position. When any one of the switches is closed, the illumination circuit 160 is also closed to energize the white lamps 129.

The switch 130 when closed, energizes the red lamps through a circuit interrupter 164 to provide intermittent flashing. Switch 138 establishes illumination in the side signal lamps 26 and 28 which illuminate the translucent panels 32 and 34, and which bear indicia such as State Police as shown.

It will be seen that the apparatus is readily controlled by the law enforcement officer in the patrol car to indicate the mere presence of police, or to issue orders to motorists located ahead or behind as desired, and that at will the red flasher may be employed either to attract immediate attention, or for use in emergency fast driving as a warning to clear the road.

The gear reduction with its worm drive holds the reel in any position in which it is set, and the motor inertia is small so that the reel stops substantially instantaneously in the desired position, the instant the cam breaks the selected circuit. Accurate indexing of the cam actuated switches, so that the reel will stop with its indicia bearing plates 78 in vertical planes, is obtained by angularly shifting the plate 120, secured against the end support 54 by screws 122 extending through the arcuate slots 124. The connections between the signal device and the control box may be provided with detachable connections such as 180.

While a single embodiment of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A rotary signal comprising a housing having spaced parallel windows, a polygonal drum having signal indicia bearing faces disposed between the windows on a shaft extending midway between and parallel to the planes of said windows, motor means for rotating said drum, a cam having a single notch secured for rotation with said drum, cam actuated switches disposed around said cam and having a follower adapted to be actuated by said notch to establish drum stopping positions each of said followers being angularly disposed in relation to the other followers in correspondence with the angular relation between the drum faces, each of said cam switches being in a circuit with a selector switch, said cam switch and selector switch circuits being connected in parallel, and together in series with said motor.

2. A rotary signal comprising a housing having spaced parallel windows, a polygonal drum having signal indicia bearing faces disposed between the windows on a shaft extending midway between and parallel to the planes of said windows, motor means for rotating said drum, a cam having a single notch secured for rotation with said drum, cam actuated switches angularly disposed around said cam and each having a follower adapted to be actuated by said notch to establish drum stopping positions, common means for mounting said switches in circumferential angularly spaced positions around said cam whereby to establish drum stopping positions each of said followers being angularly disposed in relation to the other followers in correspondence with the angular relation between the drum faces, and means for angularly setting said mounting means about the axis of said shaft to index the drum stopping positions with respect to said windows, each of said cam switches being in a circuit with a selector switch, said cam switch and selector switch circuits being connected in parallel, and together in series with said motor.

3. A rotary signal device comprising a frame having a base plate, and upstanding spaced end supports, a transverse shaft support member mounted on the outside of each of said end supports in spaced relation to the end support, a stationary shaft extending between said end support members, a polygonal drum having translucent faces with indicia thereon rotatably mounted on said shaft and located between said end supports, means mounted on said shaft within said drum to illuminate said drum faces a sleeve extending through the end support and affixed to each end of said drum, a cam fixed to one of said sleeves and disposed between one of said end supports and support members having a single notch, cam operated switches angularly disposed about said cam and adapted to be operated one at a time by said cam notch and carried by said last named end support, said switches being angularly disposed in relation to each other in correspondence with the angular relation between the drum faces a drive gear fixed to the other of said sleeves and disposed between the other end support and member, and drive means including a motor affixed to said last named end support and acting through said gear to rotate said drum, a control circuit including said motor and a plurality of circuits connected in parallel, each including a selector switch and cam switch in series with said motor, and illuminating means for opposed drum faces including reflectors disposed within said drum and affixed to said shaft.

4. A rotary signal device comprising a frame having a base plate, and upstanding spaced end supports, a transverse shaft support member mounted on the outside of each of said end supports in spaced relation to the end support, a stationary shaft extending between said end support members, a polygonal drum having translucent faces with indicia thereon rotatably mounted on said shaft and located between said end supports, means mounted on said shaft within said drum to illuminate said drum faces, a sleeve extending through the end support affixed to each end of said drum, a cam fixed to one of said sleeves and disposed between one of said end supports and support members having a single notch, a cam operated switch support plate affixed to said last named end supports, cam operated switches angularly disposed about said cam and adapted to be operated one at a time by said cam notch and mounted on said plate, said switches being angularly disposed in relation to each other in correspondence with the angular relation between the drum faces and means for angularly indexing said plate about the axis of said shaft to index said cam controlled switches in relation to said cam, a drive gear fixed to the other of said sleeves and disposed between the other end support and member, and drive means including a motor affixed to said last named end support and acting through said gear to rotate said drum, a control circuit including said motor and a plurality of circuits connected in parallel, each including a selector switch and cam switch in series with said motor, and illuminating means for opposed drum faces including reflectors disposed within said drum and affixed to said shaft.

5. A rotary signal device comprising a frame having a base plate, and upstanding spaced end supports, a transverse shaft support member mounted on the outside of each of said end supports in spaced relation to the end support, a stationary shaft extending between said end supports, a polygonal drum having translucent faces with indicia thereon rotatably mounted on said shaft and located between said end supports, means mounted on said shaft within said drum to illuminate said drum faces, a sleeve extending through the end support on each end of said drum, a cam fixed to one of said sleeves and disposed between one of said end supports and support members having a single notch, cam operated switches angularly disposed about said cam and adapted to be operated one at a time by said cam and carried by said last named end support, said switches being angularly disposed in relation to each other in correspondence with the angular relation between the drum faces, a drive gear fixed to the other of said sleeves and disposed between the other end support and member, and drive means including a motor affixed to said last named end support and acting through said gear to rotate said drum, a control circuit including said motor and a plurality of circuits connected in parallel each including a selector switch and cam switch in series with said motor.

6. A rotary signal device comprising a frame having a base plate, and upstanding spaced end supports, a transverse shaft support member mounted on the outside of each of said end supports in spaced relation to the end support, a stationary shaft extending between said end supports, a polygonal drum having translucent faces with indicia thereon rotatably mounted on said shaft and located between said end supports, means mounted on said shaft within said drum to illuminate said drum faces, a sleeve extending through the end support on each end of said drum, a cam fixed to one of said sleeves and disposed between one of said end supports and support members having a single notch, cam operated switches angularly disposed about said cam and adapted to be operated one at a time by said cam and carried by said last named end support, said switches being angularly disposed in relation to each other in correspondence with the angular relation between the drum faces, a drive gear fixed to the other of said sleeves and disposed between the other end support and member, and drive means including a motor affixed to said last named end support and acting through said gear to rotate said drum.

7. A rotary signal device comprising a frame having a base plate, and upstanding spaced end supports, a transverse shaft support member mounted on the outside of each of said end supports in spaced relation to the end support, a stationary shaft extending between said end support members, a polygonal drum having translucent faces with indicia thereon rotatably mounted on said shaft and located between said end supports, means mounted on said shaft within said drum to illuminate said drum faces, a sleeve extending through the end support affixed to each end of said drum, a cam fixed to one of said sleeves and disposed between one of said end supports and support members having a single notch, a cam operated switch support plate affixed to said last named end supports, cam operated switches angularly disposed about said cam and adapted to be operated one at a time by said cam and mounted on said plate, said switches being angularly disposed in relation to each other in correspondence with the angular relation between the drum faces and means for angularly indexing said plate about the axis of said shaft to index said cam controlled switches in relation to said cams.

References Cited in the file of this patent
UNITED STATES PATENTS

| | | |
|---|---|---|
| 1,244,873 | Lohr | Oct. 30, 1917 |
| 1,677,883 | Carlsen | July 24, 1928 |
| 2,162,161 | Cotant | June 13, 1939 |
| 2,345,979 | Ivey | Apr. 4, 1944 |
| 2,486,476 | Kelley | Nov. 1, 1949 |
| 2,676,311 | Palazzolo | Apr. 20, 1954 |
| 2,816,259 | Papitto | Dec. 10, 1957 |